United States Patent [19]
De Doncker et al.

[11] Patent Number: 5,166,593
[45] Date of Patent: Nov. 24, 1992

[54] CLOSED-LOOP TORQUE FEEDBACK FOR A UNIVERSAL FIELD-ORIENTED CONTROLLER

[75] Inventors: Rik W. A. A. De Doncker; Robert D. King, both of Schenectady; Peter C. Sanza, Clifton Park; Kenneth B. Haefner, Schenectady, all of N.Y.

[73] Assignee: General Electric Company, Schenectady, N.Y.

[21] Appl. No.: 769,693

[22] Filed: Oct. 2, 1991

[51] Int. Cl.$^5$ ............................................. H02D 5/40
[52] U.S. Cl. ................................. 318/800; 318/803; 318/805
[58] Field of Search ..................... 318/798–812

[56] References Cited

U.S. PATENT DOCUMENTS

| | | | |
|---|---|---|---|
| 4,023,083 | 5/1977 | Plunkett | 318/810 |
| 4,310,791 | 1/1982 | Akamatsu | 318/812 |
| 4,418,308 | 11/1983 | Bose | 318/811 |
| 4,453,116 | 6/1984 | Bose | 318/799 |
| 4,707,651 | 11/1987 | Schauder | 318/807 |
| 4,885,518 | 12/1989 | Schauder | 318/798 |
| 4,968,925 | 11/1990 | De Doncker | 318/803 |

*Primary Examiner*—William M. Shoop, Jr.
*Assistant Examiner*—John W. Cabeca
*Attorney, Agent, or Firm*—Jill M. Breedlove; Marvin Snyder

[57] ABSTRACT

A torque feedback system is employed in a universal field-oriented (UFO) controller to tune a torque-producing current command and a slip frequency command in order to achieve robust torque control of an induction machine even in the event of current regulator errors and during transitions between pulse width modulated (PWM) and square wave modes of operation.

4 Claims, 1 Drawing Sheet

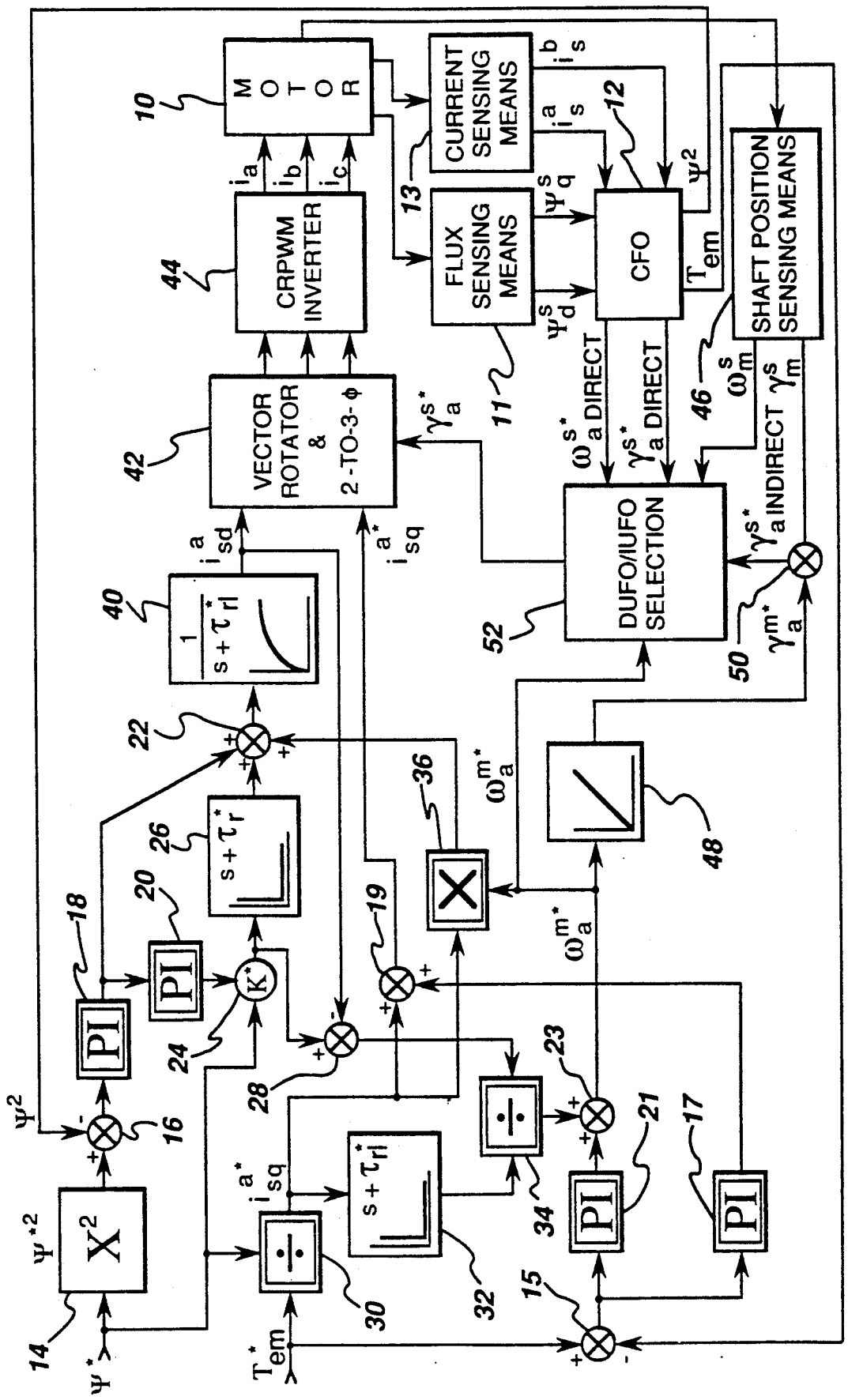

CLOSED-LOOP TORQUE FEEDBACK FOR A UNIVERSAL FIELD-ORIENTED CONTROLLER

The Government of the United States of America has rights in this invention pursuant to Contract No. DEA-CO7-90ID13019 awarded by the U.S. Department of Energy.

RELATED APPLICATIONS

This application is related to commonly assigned U.S. patent application Ser. No. 07/769,692 of R. W. A. A. De Doncker, filed concurrently herewith and incorporated by reference herein.

FIELD OF THE INVENTION

The present invention relates generally to field-oriented controllers. More particularly, the present invention relates to closed-loop torque feedback for a universal field-oriented controller for an induction machine.

BACKGROUND OF THE INVENTION

In commonly assigned U.S. Pat. No. 4,968,925 of Rik W. A. A. De Doncker, issued Nov. 6, 1990, a universal field-oriented (UFO) controller is described which allows for field-oriented control of induction machines in an arbitrary flux reference frame. The principle of the UFO controller applies to both direct and indirect field orientation. In practice, this allows for the integration of six different field orientation schemes into a single control, i.e., direct and indirect field orientation in rotor flux, air gap flux and stator flux reference frames. In operation of the UFO controller, a synchronous reference frame is selected by setting the effective stator-to-rotor turns ratio to a predetermined value corresponding thereto. Transitions between reference frames are accomplished by changing the turns ratio. The result is complete decoupling of torque and flux in a flexible, simple and robust drive that is relatively insensitive to machine parameters. U.S. Pat. No. 4,968,925 is incorporated by reference herein.

U.S. patent application Ser. No. 87/769,692 of R. W. A. A. De Doncker, cited hereinabove, describes a high-speed flux feedback system for a UFO controller which quickly and accurately provides the amplitude and angle components of flux for use in a field-oriented control scheme. Flux feedback according to Ser. No. 07/769,692 results in tuned operation of an induction machine drive at the commanded flux and corresponding slip frequency unless errors are introduced by, for example, the current regulator and/or inverter. Such errors may cause the torque produced by the motor to differ from the commanded torque. Therefore, it is desirable to provide a torque feedback loop for a UFO controller in order to maintain robust torque control over a wide speed range.

SUMMARY OF THE INVENTION

A torque feedback system is employed in a UFO controller for an induction machine to tune a torque-producing current command and a slip frequency command. The direct (d) and quadrature (q) components of flux $\Psi_d^s$ and $\Psi_q^s$, respectively, are sensed by flux sensors; and stator phase currents are sensed by current sensors to provide the dq components of current $i_{sd}^s$ and $i_{sq}^s$, respectively. Torque is calculated from the sensed flux and current quantities according to the expression:

$$T_{em} = \frac{3}{2} p(i_{sq}^s \Psi_d^s - i_{sd}^s \Psi_q^s),$$

where p represents the stator pole pair number. The value of torque $T_{em}$ is compared with a torque command, and the resulting corrected torque command is used to tune the current command and the slip frequency command.

BRIEF DESCRIPTION OF THE DRAWINGS

The features and advantages of the present invention will become apparent from the following detailed description of the invention when read with the sole accompanying drawing FIGURE which illustrates a UFO controller employing torque feedback in accordance with a preferred embodiment of the present invention.

DETAILED DESCRIPTION OF THE INVENTION

The drawing FIGURE illustrates a UFO controller of the type described in De Doncker U.S. Pat. No. 4,968,925, cited hereinabove, with the addition of flux feedback, as described in U.S. patent application Ser. No. 07/769,692, cited hereinabove, and further employing torque feedback in accordance with the present invention. As described in U.S. Pat. No. 4,968,925, the induction machine equations expressed in an arbitrary synchronous reference frame i linked to an arbitrary flux vector are as follows:

$$v_s^i = R_s i_s^i + \frac{d\Psi_s^i}{dt} + j\frac{d\gamma_i^s}{dt} \Psi_s^i \tag{1}$$

$$0 = R i_r^i + \frac{d\Psi_r^i}{dt} + j\frac{d\gamma_i^m}{dt} \Psi_r^i \tag{2}$$

$$\Psi_s^i = L_s i_s^i + L_h i_r^i = L_{sl} i_s^i + \Psi_h^i \tag{3}$$

$$\Psi_r^i = L_h i_s^i + L_r i_r^i = L_{rl} i_r^i + \Psi_h^i \tag{4}$$

$$T_{em} = \frac{3}{2} p \, Im(i_s^i \cdot \Psi_s^{i*}) \tag{5}$$

$$J \frac{d^2\gamma_m^s}{dt^2} = T_{em} - T_{load} \tag{6}$$

$$\gamma_m^s + \gamma_i^m = \gamma_i^s \tag{7}$$

with $$L_s = L_h + L_{sl}$$

$$L_r = L_h + L_{rl}$$

where:
$v_s^i$ = instantaneous stator voltage
$R_s$ = stator resistance
$R_r$ = rotor resistance
$L_h$ = main inductance
$L_{sl}$ = stator leakage inductance
$L_{rl}$ = rotor leakage inductance
$L_s$ = Stator inductance
$L_r$ = rotor inductance
$T_{em}$ = electromagnetic torque
p = pole pair number
$T_{load}$ = load torque
J = system inertia $\gamma_m{}^s$ = angular position of rotor shaft with respect to a fixed stator reference frame $\gamma_i{}^s$ = angle from a fixed stator reference to arbitrary reference frame i $\gamma_i{}^m$ = angle from the rotor shaft to arbitrary reference frame i;

and the system variables, including flux linkage $\Psi$ and current i, are written according to the following convention:

$$x^j = x^i_{jd} + jx^i_{jq} = x^i_{jd} + \sqrt{-1}\; x^i_{jq}$$

with:

j=r: rotor quantities
j=s: stator quantities
j=h: air gap quantities
j=m: mechanical rotor quantity (position)
i=r: rotor flux synchronous reference frame
i=s: stationary reference frame linked to phase a of the stator windings
i=t: stator flux synchronous reference frame
i=h: air gap flux reference frame
i=m: rotating reference frame linked to the rotor shaft
i=i: arbitrary synchronous reference frame
i=a: synchronous reference frame linked to arbitrary flux vector.

According to U.S. Pat. No. 4,968,925, the arbitrary reference frame i is linked to an arbitrary flux vector which can be derived from flux linkage equations (3) and (4) above by means of a stator-to-rotor effective turns ratio (a) transformation.

As shown in the drawing FIGURE, the UFO controller of the present invention includes a first torque feedback loop for regulating the torque-producing current command $i_{sq}{}^{a*}$. A second torque feedback loop is provided to regulate the slip frequency $\omega_a{}^{m*}$. In this way, robust torque control is maintained over a wide speed range and during transitions between modes of operation such as, for example, transitions between a current-controlled PWM mode and a six-stepped square wave mode at the corner point speed of the motor. Moreover, the torque feedback loop maintains robust control during both direct (DUFO) and indirect (IUFO) field-orientation modes.

As shown in the drawing FIGURE, for operation of the UFO controller in a direct field orientation (DUFO) mode, measurements of the direct (d) and quadrature (q) components of flux, $\Psi_d{}^s$ and $\Psi_q{}^s$, respectively, are taken from the respective stator phases of an induction motor 10 by a flux sensing means 11; and phase current measurements $i_s{}^a$ and $i_s{}^b$ are taken by a current sensing means 13. (By way of example, current measurements are shown as being taken from two phases only of a three-phase machine, e.g., phases a and b; however, phase current measurements could be taken from all three phases, if desired.) The sensed flux and current quantities are provided to a calculator for field orientation (CFO) 12. CFO 12 quickly and accurately determines the amplitude and angle components of flux from the flux measurements and provides flux amplitude squared feedback $\Psi^2$ (or, alternatively, linear flux feedback $\Psi$) in accordance with U.S. patent application Ser. No. 07/769,692. Furthermore, in accordance with the present invention, CFO 12 quickly and accurately determines the induction motor torque $T_{em}$ for use as feedback for tuning the torque-producing current command $i_{sq}{}^{a*}$ and the slip frequency command $\omega_a{}^{m*}$.

Flux sensing means 11 may comprise Hall effect sensors or flux coils to measure flux directly. Alternatively, flux sensing means 11 may calculate flux from measurements of stator voltages and currents in a well-known manner according to:

$$\Psi = \int(V_s - I_s R_s)dt,$$

where $R_s$ is the resistance of the respective stator phase winding, $V_s$ is the stator voltage, and $I_s$ is the respective stator phase current.

Current sensing means 13 may comprise any suitable current sensors, such as, for example, Hall effect current sensors, current sensing transformers or current sensing resistors.

In accordance with the present invention, torque $T_{em}$ is determined by CFO 12 using the sensed flux and current quantities according to the expression:

$$T_{em} = \frac{3}{2} p(i_{sq}^s \Psi_d^s - i_{sd}^s \Psi_q^s).$$

For example, if phase a is chosen as the reference phase, then the d component of current $i_{sd}{}^s$ is equal to the sensed phase a current; and the q component of current $i_{sq}{}^s$ is determined by the expression:

$$i_{sq}^s = \frac{\sqrt{3}}{3}(i_s^a + 2i_s^b).$$

As shown in the drawing FIGURE, the torque $T_{em}$ is compared in a summer 15 to the torque command $T_{em}{}^*$, and the resultant difference signal takes two paths. In a first of the two paths, the difference signal from summer 15 is applied to a proportional-integral (PI) compensator 17. The output signal from PI compensator 17 is added in a summer 19 to the current command $i_{sq}{}^{a*}$, which is derived from the torque command $T_{em}{}^*$ by a dividing block 30. The torque-producing current command $i_{sq}{}^{a*}$ is thereby tuned for robust control in any mode of operation.

In the second torque feedback path, the difference signal from summer 15 is applied to another PI compensator 21. The output signal from PI compensator 21 is added in a summer 23 to a slip frequency command $\omega_a{}^{m*}$, which is derived from the current command $i_{sq}{}^{a*}$ via blocks 32 and 34, as described hereinbelow. The slip frequency command $\omega_a{}^{m*}$ is thereby tuned for robust control in any mode of operation.

The remaining elements of the UFO controller shown in the drawing FIGURE are described in U.S. patent application Ser. No. 07/769,692. In particular, a flux command $\Psi_s{}^*$ is squared in a multiplier 14 and then compared by a summer 16 with the flux amplitude squared feedback $\Psi^2$ from CFO 12. The resultant error signal is applied to a proportional-integral (PI) compensator 18, the output signal of which is applied to another PI compensator 20 and, via an alternate path, to a summer 22. The output of PI compensator 20 is added to the open loop gain $K^*$ of a multiplier 24. In particular, PI compensator 20 is set to provide a slow gain change to adapt $K^*$ to tune the UFO controller. An expression for the open loop gain is given as follows:

$$K^* = \frac{1}{a^*L_h^*\sigma_a^*},$$

where $$\sigma = \frac{a^*L_r^* - L_h^*}{a^*L_r^*},$$

The resulting signal $K^*\Psi_s^*$ is applied to a circuit 26 having the transfer function $$s + \tau_r^*,$$

where $$\tau_r^* = \frac{R_r^*}{L_r^*} = \frac{1}{T_r^*}.$$

The signal $K^*\Psi_s^*$ is also applied, via an alternate path, to a summer 28 wherein it is combined with the direct component of stator current $i_{sd}{}^a$ according to the UFO decoupling equations set forth in De Doncker U.S. Pat. No. 4,968,925, cited hereinabove. The stator current command $i_{sq}{}^{a*}$, derived from torque command $T_{em}^*$ via a dividing block 30, is applied to circuit 32 having the transfer function $$s + \tau_{rl}^*,$$

where $$\tau_{rl}^* = \frac{R_r^*}{\sigma_a^* L_r^*} = \frac{1}{T_r^*}.$$

The resulting signal is divided in a divider 34 by the output signal of summer 28 to produce a rotor slip frequency command $\omega_a{}^{m*}$. Stator current command $i_{sq}{}^{a*}$ is also applied to a multiplier 36 wherein it is multiplied by rotor slip frequency command $\omega_a{}^{m*}$. The output signal of multiplier 36 is added in summer 22 to the aforementioned output signal of circuit 26 and to the output signal from PI compensator 18. PI compensator 18 is set to provide fast flux feedback so that when the open loop gain $K^*$ is tuned by slow PI compensator 20, then the output signal from PI compensator 18 is nulled. The output signal from summer 22 is applied to a circuit 40 having the transfer function $$\frac{1}{s + \tau_{rl}^*},$$

which provides the direct component of stator current $i_{sd}{}^a$.

The direct component of stator current $i_{sd}{}^a$ from circuit 40 and the q-component current command $i_{sq}{}^{a*}$ are provided to a vector rotator and two-to-three-phase transformation block 42 which transforms the dq coordinates of the stator current vector from an arbitrary synchronous reference frame (linked to an arbitrary flux vector) to a stationary three-phase reference frame, as described in U.S. Pat. No. 4,968,925, cited hereinabove. In particular, in the UFO control scheme illustrated in the drawing FIGURE, the output signals from vector rotator block 42 comprise three-phase drive signals for energizing the three phases of a current-regulated pulse-width modulated (CRPWM) inverter 44 to drive the three phases of induction motor 10 in well-known fashion.

For operation of the UFO controller of the drawing FIGURE in an indirect field-orientation mode (IUFO) mode, shaft position sensing means 46 is used to measure rotor position angle $\gamma_m{}^s$ and further to provide a frequency measurement $\omega_m{}^s$. An integrator 48 is provided to integrate the rotor slip-=frequency command $\omega_a{}^{m*}$, yielding a rotor slip angle command $\gamma_a{}^{m*}$. The rotor slip angle command $\gamma_a{}^{m*}$ is added in a summer 50 to the rotor position signal $\gamma_m{}^s$ from shaft position sensing means 46 to produce a signal representative of the angle $\gamma_a{}^{s*}$.

The angle $\gamma_a{}^{s*}$ from summer 50, the slip frequency command $\omega_a{}^{s*}$ from dividing block 34, the output signals $\gamma_a{}^{s*}$ and $\omega_a{}^{s*}$ from CFO 12, and the frequency signal $\omega_m{}^s$ from shaft position sensing means 46 are applied to a DUFO/IUFO selection and transition block 52 for selecting operation in and enabling transitions between DUFO and IUFO modes.

Advantageously, the torque feedback system of the present invention compensates for current regulator errors and others errors, such as those introduced by inverter delays. For example, when an induction motor drive is operating in a PWM mode and transitions to a six-stepped square wave mode, the current regulator saturates. At that instant, the torque and flux feedback control of current may saturate, but the torque feedback control of slip frequency takes over and maintains proper control of torque.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A torque feedback system for a field-oriented controller for an induction motor, comprising:
   flux sensing means for sensing the direct and quadrature components and $\Psi_d{}^s$ and $\Psi_q{}^s$, respectively, of flux in a stationary reference frame linked to a predetermined phase of the induction motor;
   current sensing means for sensing the respective stator phase currents in at least two phases of the induction motor in a stationary reference frame linked to a predetermined phase of the induction motor;
   torque-calculating means for calculating torque $T_{em}$ from the sensed components of flux and the sensed stator phase currents;
   comparator means for comparing the torque from said torque-calculating means to a torque command and generating a difference signal therefrom;
   a first torque feedback loop for receiving said difference signal and tuning a current command in accordance therewith; and
   a second torque feedback loop for receiving said difference signal and tuning a slip frequency command in accordance therewith.

2. The torque feedback system of claim 1 wherein the induction motor has three stator phases and current is sensed by said current sensing means in two of said stator phases, the torque being calculated by said torque-calculating means according to the expression:

$$T_{em} = \frac{3}{2} p(i_{sq}^s \Psi_d^s - i_{sd}^s \Psi_q^s).$$

wherein p represents the number of pole pairs of the induction motor, and wherein one of the two sensed phases is chosen as the reference phase so that the d component of current $i_{sd}^s$ is equal to the phase current $i_s^a$ sensed on said one of said phases, and the q component of current $i_{sq}^s$ is determined according to the expression:

$$i_{sq}^s = \frac{\sqrt{3}}{3} (i_s^a + 2i_s^b).$$

wherein the phase current sensed on the second one of the sensed phases is represented by $i_s^b$.

3. The torque feedback system of claim 1 wherein the said flux sensing means comprises flux coils.

4. The torque feedback system of claim 1 wherein said flux sensing means comprises:
voltage sensing means for sensing the stator voltage $V_s$ across the respective stator phase winding; and
flux estimating means for providing an estimate of the flux $\Psi$ according to:

$$\Psi = \int (V_s - I_s R_s) dt.$$

where $R_s$ is the resistance of the respective stator phase winding, and $I_s$ is the respective stator phase current.

* * * * *